United States Patent
Ulintz (10) Patent No.: US 6,729,648 B2
(45) Date of Patent: May 4, 2004

(54) NON-LINEAR ENERGY ABSORBING COLUMN ASSEMBLY

(75) Inventor: Peter J. Ulintz, Broadview Heights, OH (US)

(73) Assignee: Sealy Technology LLC, Trinity, NC (US)

( * ) Notice: Subject to any disclaimer, the term of this patent is extended or adjusted under 35 U.S.C. 154(b) by 19 days.

(21) Appl. No.: 10/165,333

(22) Filed: Jun. 7, 2002

(65) Prior Publication Data

US 2003/0227162 A1 Dec. 11, 2003

(51) Int. Cl.⁷ ................................................ B62D 1/11
(52) U.S. Cl. ......................................... 280/777; 74/492
(58) Field of Search ........................ 280/777; 74/492, 74/493

(56) References Cited

U.S. PATENT DOCUMENTS

| | | | |
|---|---|---|---|
| 3,392,599 A | | 7/1968 | White |
| 3,457,800 A | | 7/1969 | Toshida et al. |
| 3,491,614 A | * | 1/1970 | Saunders et al. ............. 74/493 |
| 3,538,783 A | | 11/1970 | Butts |
| 3,597,994 A | | 8/1971 | Masanao |
| 3,665,777 A | | 5/1972 | Jensen |
| 3,699,824 A | | 10/1972 | Staudenmayer |
| 3,757,601 A | | 9/1973 | Burke |
| 3,788,148 A | * | 1/1974 | Connell et al. ............... 74/492 |
| 3,815,438 A | * | 6/1974 | Johnson ....................... 74/492 |
| 4,006,647 A | | 2/1977 | Oonuma et al. |
| 4,445,708 A | * | 5/1984 | Oakes et al. ................ 280/777 |
| 4,805,478 A | * | 2/1989 | Beauch ........................ 74/492 |
| 4,898,566 A | * | 2/1990 | Hakansson .................. 464/167 |
| 5,115,691 A | * | 5/1992 | Beauch ........................ 74/493 |
| 5,320,374 A | * | 6/1994 | Farris et al. ................ 280/276 |
| 5,495,777 A | | 3/1996 | Schneider et al. |
| 5,507,203 A | | 4/1996 | Audibert et al. |
| 5,634,662 A | * | 6/1997 | Asayama ..................... 280/777 |
| 5,669,633 A | | 9/1997 | Naff et al. |
| 5,722,300 A | * | 3/1998 | Burkhard et al. ............. 74/493 |
| 5,829,310 A | | 11/1998 | DePaolis |
| 6,038,941 A | * | 3/2000 | Hobaugh et al. ............. 74/493 |
| 6,109,652 A | | 8/2000 | Kim et al. |
| 6,170,862 B1 | | 1/2001 | Hoagland et al. |
| 6,339,970 B1 | | 1/2002 | Blex |
| 6,343,993 B1 | * | 2/2002 | Duval et al. ................ 464/167 |

* cited by examiner

*Primary Examiner*—Charles T. Jordan
*Assistant Examiner*—Bret Hayes
(74) *Attorney, Agent, or Firm*—Roetzel & Andress (57) ABSTRACT

A non-linear energy-absorbing column assembly has tunable force gradient which enables a non-linear collapse response under rapid dynamic loading. The column assembly includes the cooperating components of an outer sleeve, an inner tube, and a bearing sleeve, the inner tube received within the bearing sleeve, and the bearing sleeve received within the outer sleeve. Radially spaced serrations are made in an insert end of the inner tube to form one or more deflection tabs at an end of the inner tube. The bearing sleeve holds one or more spherical elements in contact with one or more deflection tabs of the inner tube, and in contact with an interior surface of the outer sleeve. Variable deflection of the deflection tabs in response to the changing location of the spherical elements on the deflection tabs produces a non-linear collapse response under an axial load applied to the assembly, which eliminates peak load spikes or other abrupt linear transition from initial loading to a substantially constant collapse mode. Variable arrangements of spherical elements in the bearing sleeve are also described and claimed.

21 Claims, 4 Drawing Sheets

NON-LINEAR ENERGY ABSORBING COLUMN ASSEMBLY

FIELD OF THE INVENTION

This invention relates generally to energy absorbing devices, and more particularly, to energy absorbing subassemblies for use in mechanical systems for controlled energy absoprtion.

BACKGROUND OF THE INVENTION

The speed and power of motor vehicles has led to the development of numerous occupant protection systems designed to absorb or divert the energy of collisions. In frontal impact vehicle collisions, the driver is thrown forward due to inertia, striking the head, neck and chest against the steering wheel and inducing massive trauma. Many approaches have been taken to designing collapsible or otherwise energy absorbing steering wheels and column assemblies to reduce this type of injury. Most mechanical designs, apart from the well-developed air bag technology, utilize an inner shaft and an outer supporting post assembly in a telescoped arrangement, with energy absorbing elements mechanically interposed between or otherwise connected to the inner and outer elements. A deficiency of most prior art designs is a force displacement curve with excessive slope and high initial peak load forces in the region of initial movement of the column system.

For example, U.S. Pat. No. 3,457,800 discloses a steering column assembly comprising an upper and lower steering column shaft engaged to each other. A jacket tube rotatably supporting the upper steering column shaft, is supported by a clamp member which allows it to slide in the lower direction. A plastically deformable impact absorbing means, will absorb the impact, while the lower steering column shaft, including the flexible member will not transmit any harmful effect to the steering wheel.

U.S. Pat. No. 3,597,994 discloses a tubular steering column having telescopic portions arranged coaxially arranged about the steering shaft and an energy-absorbing member capable of plastic deformation under tension or compression.

U.S. Pat. No. 3,665,777 discloses a steering column assembly which includes an energy absorbing outer jacket and a telescopically collapsible steering shaft. The shaft has a resilient friction member separating the inner and outer shaft components. The friction member is radially compressed between the two components to maintain the relative position of the shaft components and prevent vibration.

U.S. Pat. No. 5,507,203 discloses a steering shaft coupling which contains an outer tubular shaft and an inner shaft slidably inserted within the outer tubular shaft. Additionally a biasing member positioned between the inner and outer shafts, produces a force which opposes the transmitted torque.

U.S. Pat. No. 6,109,652 discloses a steering column with upper and lower columns and a shock absorbing device therebetween. The shock absorbing device has a plurality of friction members, which contact the external surface of the lower column. The shock absorbing device effectively absorbs and relieves shock in the initial stage of a collision, protecting the driver.

U.S. Pat. No. 6,170,862 discloses a collapsible steering column that has an elongated hollow cylinder slidably mounted on a piston. The space between the interior wall of the cylinder and the piston is sealed in a gas-tight fashion. A coil spring inside the cylinder urges the piston and the bottom of the cylinder apart. When a collision occurs, the sensor sends an electronic signal which ignites the explosive compound and fractures the seal permitting the gas to escape, causing collapse of the cylinder.

U.S. Pat. No. 6,339,970 discloses a steering column which is telescopic in the event of a crash. The outer column tube is connected to a stem by means of a shearing body. The shearing body has a shearing area which is reduced relative to its external dimensions and determined by a projection connecting its two sections. This allows the shearing body to absorb relatively large axial forces and still permit maximum admissible shearing forces.

These prior art designs all have an outer tube that is deformable upon impact to thereby absorb energy. However, the energy absorption is not smooth, but occurs abruptly in early stages as various segments of the outer tube begin to plastically deformed.

U.S. Pat. No. 3,699,824 discloses an energy absorbing steering column having a pair of telescopic steering shaft sections and a pair of telescopic tubular sections that form an outer housing. The tubular sections are separated by a plurality of pre-stressed elastomeric members that are compressed when the column is collapsed thereby absorbing energy.

U.S. Pat. No. 3,757,601 discloses a tube assembly which includes a first tube section and a second tube section telescopically disposed relative to the first tube section. A plurality of spring pins are disposed between the tube sections to generate mechanical friction to effect energy absorption at a predetermined rate during forced telescopic collapse of the tube assembly.

U.S. Pat. No. 5,669,633 discloses two tubular members which are axially displaceable. One of the tubular members contains tear-off strips with bent-over front ends having bent-over sections engaging the other tubular member. Consequently, once a relatively large force is applied to the steering shaft along the flutes, the strips are torn off and deformed, causing displacement of the members relative to each other.

These prior art designs employ a lower column interferentially fitted into the upper column to form a shock absorbing device in the interferential fitting junction between the columns. The shock absorbing device includes anything from a plurality of pre-stressed elastomeric members or tear-off strips, to a plurality of spring pins which are disposed between the tube sections to generate friction. In the event of a collision, the lower column frictionally retracts into the upper column, absorbing energy and relieving the collision impact. However, at peak force, a relative displacement between the two columns can occur, thus, preventing the lower column from gradually retracting into the upper column, and transmitting excessive axial force to the steering wheel.

U.S. Pat. No. 3,392,599 discloses a collapsible steering column assembly which includes a pair of telescopically related cylinders with a plurality of hard spheroids engaged between the cylinders. Thus, once impact energy is applied to the steering column, the spheroids cause highly localized deformation in the contact surfaces of the cylinders.

U.S. Pat. No. 3,538,783 discloses two telescoping tubular members with a sleeve containing press-fitted balls. The sleeve and ball unit is placed to be engaged between the members creating substantial interference so as to roll and cause localized deformation of the members under telescopic movement.

U.S. Pat. No. 5,495,777 discloses a steering column which includes a tubular lower mast jacket, a tubular upper mast jacket telescoped inside the lower mast jacket, and a plurality of steel spheres fitted in an overlap between the mast jackets. A plastic ball sleeve contains pockets which loosely receive the steel spheres and prevent the spheres to roll freely. Thus, a significant amount of force is required to exceed the pockets and cause collateral damage to the steering column.

These prior art designs utilize spherical elements or rigid balls press-fitted in and between two telescopically engaged posts so that under impact the posts exhibit axial relative movement and the rigid balls cause localized plastic deformation of the wall surfaces of the posts along their spherical paths. However, one disadvantage of this design is that a high magnitude of initial load is needed to start the telescopic contraction of the posts. To better control by design this high magnitude of initial load, the shock absorbing characteristics of the apparatus have to be lowered so that furthered loads absorbed by the apparatus will be abruptly decreased. Thus, the impact absorption gradient is not optimal.

Finally, U.S. Pat. No. 4,006,647 utilizes spherical elements press-fitted between two telescopically engaged cylindrical members. The spherical elements are guided to roll within recessed grooves in the outer cylindrical member. The spherical elements make almost no contact with the adjacent wall of the cylindrical member, thus only exhibiting a minor load influence. However, when the relative movement of the two cylindrical elements exceeds the maximum force, the spherical elements reach the ends of the guide grooves and are forced to ride over the surface of the cylindrical member and are pressed between the two cylindrical members causing localized plastic deformation of the surfaces of the walls. For this to function as intended, the spherical elements must be positioned within the grooves. The grooves act merely to guide the spherical elements until enough force is exerted to displace the spherical element past the ends of the grooves onto the surfaces of the cylindrical member. Additional spherical elements may be positioned adjacent to the grooves and with almost no contact with the adjacent wall surfaces of the posts 1 and 2 or very slight contact therewith only having a minor load influence thereon. An inherent disadvantage of this design is that the initiating and continuous collapse forces required to effect energy absorption by the steering column assembly can not be finely tuned according to precise parameters. Thus an initial peak load force is required in order to displace the spherical elements within the guide grooves, and a high peak load force is required to displace the spherical elements past the ends of the grooves and this higher load required to continue collapse of the steering column.

Figure 6:
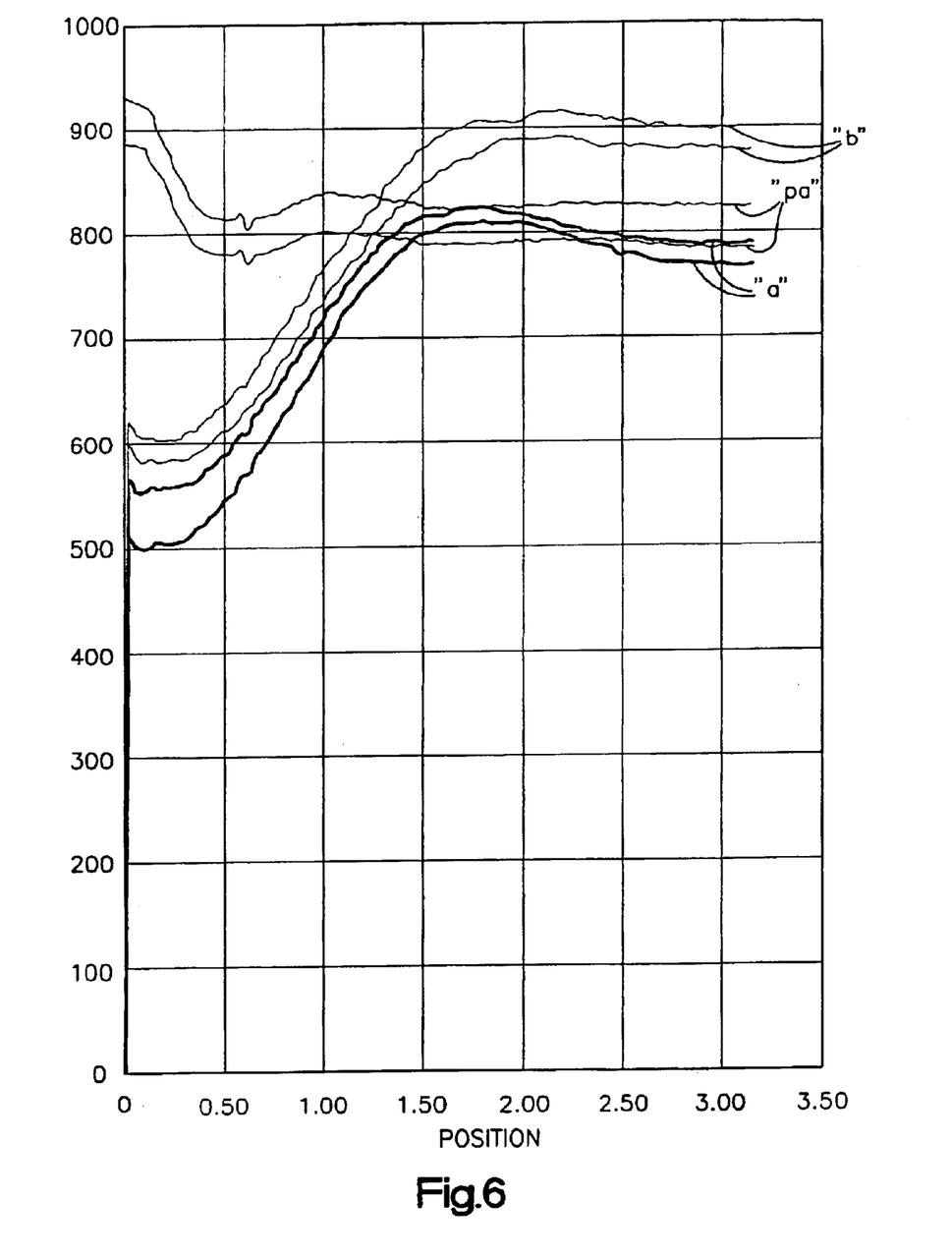
FIG. 6 is a plot of a load absorption profile of a steering column assembly of the present invention.

Plot "pa" in FIG. 6 represents the displacement force profile of a collapsible steering column of the prior art, wherein the initial displacement force spikes very high, to for example 900 LBF. or greater, and then decreases down to a constant collapse force of around 800 LBF. This represents the undesirable mechanical characteristics of a high force required to initiate collapse (more likely to cause trauma to vehicle occupant), and a decline thereafter to the constant collapse force.

These are some of the major disadvantages of collapsible or energy-absorbing steering columns of the prior art which are overcome by the present invention.

SUMMARY OF THE INVENTION

The present invention provides an impact energy absorbing steering column which absorbs impact energy in a multistage non-linear manner by gradually collapsing, without the occurrence of an initial peak load, and thus, is tunable to a precise collapse load range.

In accordance with one general aspect of the present invention, there is provided a tunable non-linear energy-absorbing column assembly having an outer sleeve, an inner tube, a bearing sleeve over the inner tube, wherein the inner tube and bearing sleeve are telescopically received within the outer cylindrical sleeve. The outer sleeve, inner tube and bearing sleeve are also referred to collectively as components of the column assembly. The outer sleeve includes a receiving end which accepts an insert end of the inner tube, and a mounting end. An insert end of the inner tube is telescopically received within the outer sleeve. The bearing sleeve houses one or more spherical elements in contact with the inner tube and the outer sleeve. The bearing sleeve is positioned over the insert end of the inner tube and then both the bearing sleeve and the inner tube are telescopically received within the outer sleeve. Two or more radially spaced serrations are made in the insert end of the inner tube, forming deflection tabs in the inner tube. The spherical elements housed within the bearing sleeve are radially offset from the serrations in the inner tube to bear directly on the deflection tabs. The extent of deflection of the deflection tabs inward toward the axis of the inner tube is a function of the position of the spherical elements along the length of the tabs. An axial force applied to the column assembly causes the inner tube to telescope further inside the receiving end of the outer sleeve, within the bearing sleeve and in contact with the spherical elements. Movement of the spherical elements relative to the length of the deflection tabs gradually increases the amount of force required to continue telescopic collapse of the steering column assembly. Thus, the number, size and spacing of the deflection tabs can be finely tuned to precisely control the amount of forced required to initiate and continue collapse the steering column assembly.

In accordance with another aspect of the present invention, there is provided a steering column assembly which does not contain a separate outer sleeve. The non-linear energy-absorbing steering column assembly includes a bracket with a cylindrical opening or bore for telescopically receiving the insert end of the inner tube and the bearing sleeve. The spherical elements in the bearing sleeve contact the bearing surface of the bore in the bracket, and holds the spherical elements in contact with the deflection tabs of the inner tube. The deflection tabs of the inner tube deflect in response to this contact with the spherical elements. The amount of force required to collapse the steering column assembly is still proportional to the amount and length of the radially spaced serrations of the inner cylindrical sleeve.

These and other aspects and principle advantages of the invention are herein described in particularized detail with reference to the accompanying Figures. Among the benefits and improvements that have been disclosed, other objects and advantages of this invention will become apparent from the following description made with reference to the accompanying drawings. The drawings constitute a part of this specification and include exemplary embodiments, and illustrate various objects, features, attributes and mechanical advantages of the invention.

DESCRIPTION OF THE FIGURES

The drawings illustrate the best mode presently contemplated of carrying out the invention.

DETAILED DESCRIPTION OF PREFERRED AND ALTERNATE EMBODIMENTS

Figure 1:
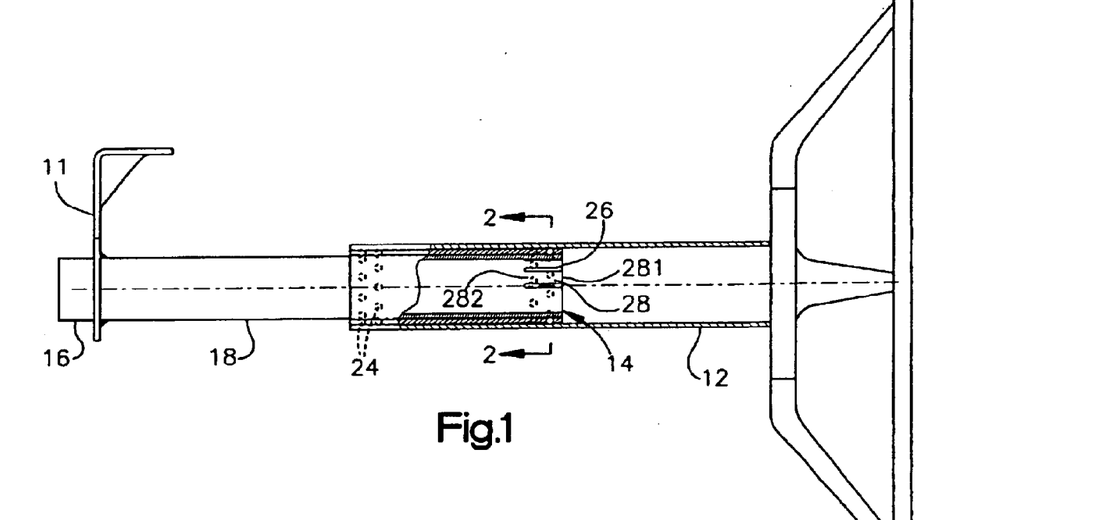
FIG. 1 is a profile view of a steering column assembly constructed according to the present invention.

Referring now to FIG. 1, a steering column assembly embodying the principles of the present invention is generally illustrated therein and designated at 10. The steering column assembly 10 is designed for use in vehicles for driver or occupant protection, but is applicable to any mechanical system wherein energy absorption is to be accomplished in a controlled or tuned manner. The steering column assembly 10 includes an inner tube 18, which may be attached at end 16 to a mounting structure or bracket 11 or other mounting structure, such as the internal frame of a vehicle. An opposite distal end 14 of tube 18 is received within a cylindrical bearing sleeve 22 (also referred to as a "ball sleeve"), which holds multiple spherical elements 24 in contact with the outer diameter of the inner tube 18 around the distal end 14. An outer cylindrical sleeve 12 fits over the bearing sleeve 22 and the spherical elements 24 therein. A steering wheel or other component may be mounted to or in contact with the opposite end of the outer sleeve 12 in the application of the invention to a steering column assembly 10, it being understood that the principles of the invention are applicable to any mechanical system wherein tunable control over the rate of energy absorption is required.

Figure 2:
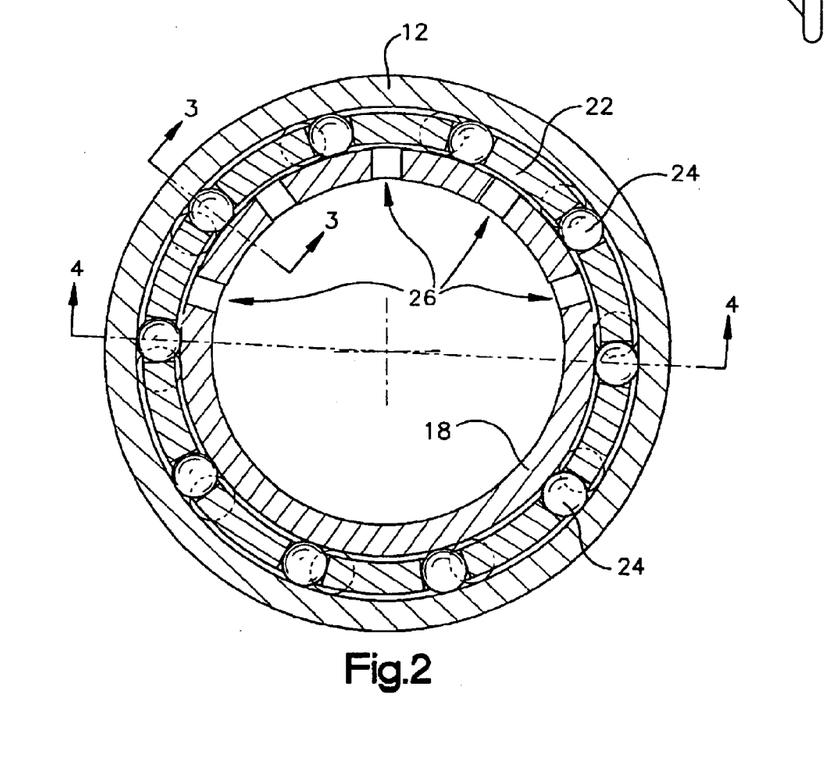
FIG. 2 is a cross-sectional view, along lines 2—2 in FIG. 1, of the steering column assembly of the present invention.

As shown in FIGS. 1 and 2, end 121 of the outer sleeve 12 fits telescopically over end 14 of the inner tube 18 and the bearing sleeve 22. The bearing sleeve 22 houses one or more spherical elements 24 having a diameter slightly greater than the clearance between the outer diameter of the inner tube 18 and the inner diameter of the outer sleeve 12. The spherical elements 24 are thus in contact with the opposing surfaces of the telescoped sleeves. Two or more radially spaced serrations 26 are formed at end 14 of the inner tube 18, forming one or more deflection tabs 28 therebetween. Each serration 26 is radially offset from each of the spherical elements 24 in the bearing sleeve 22, and vice versa, aligning the spherical elements 24 directly in contact with the deflection tabs 28. The deflection tabs 28 bend toward the axis of the inner tube 18 as the spherical elements 24 bear against them. The distal ends 281 of the tabs 28 deflect more easily (under less force) than does the area of the tabs closer to the ends of serrations 26, so that the force required to continue the collapse of the assembly increases as the spherical elements 24 move in this direction relative to the tabs. Thus, a greater amount of external force on the steering wheel 13 is required to continue the telescopic movement of the sleeve 12, as the spherical elements 24 move relative to the deflection tabs 28, into contact with the deflection tabs 28. In a preferred embodiment, the spherical elements 24 are steel balls which are press-fit in spherical receptacles in the bearing sleeve 22.

By this construction the column assembly of the invention has five principle cooperative components in the form of the outer sleeve 12, the bearing sleeve 22, the spherical elements 24 in the bearing sleeve 22, the inner tube 18, and the deflection tabs 28 formed as part of the inner tube 18.

Figure 3:
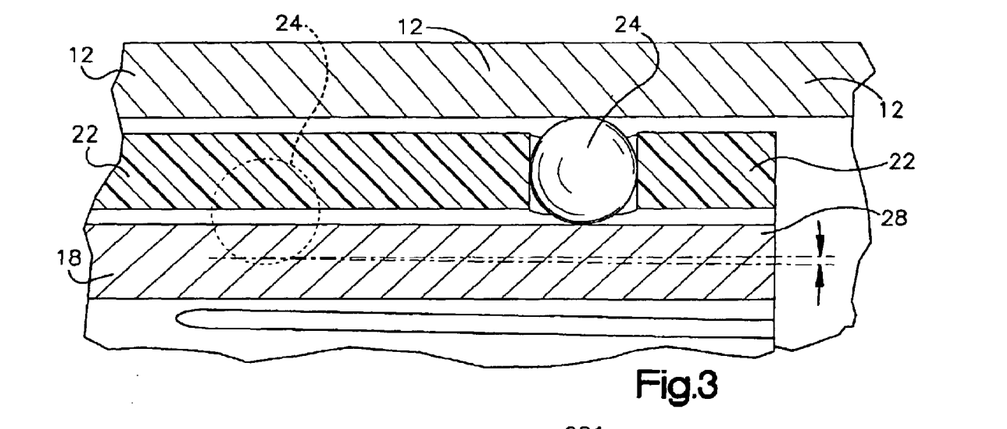
FIG. 3 is a cross-sectional view, along lines 3—3 in FIG. 1, of the steering column assembly of the present invention.
Figure 4:
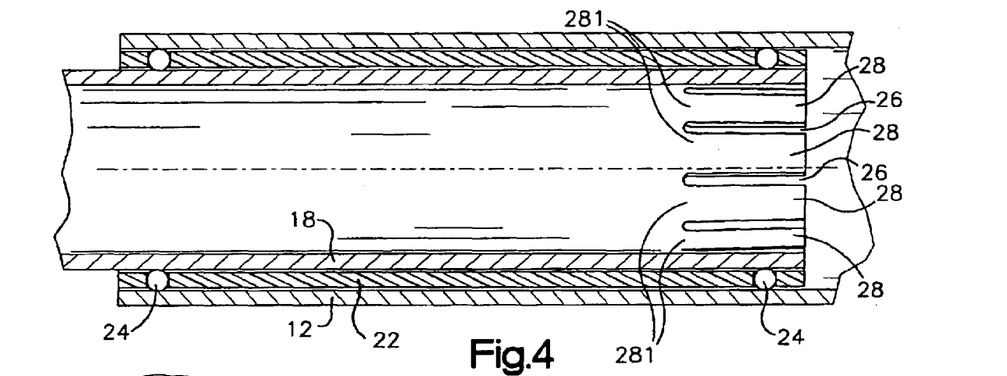
FIG. 4 is a cross-sectional view along the lines 4—4 in FIG. 1, of the steering column assembly of the present invention.

As depicted in FIGS. 3 and 4, a deflection tab 28 is formed between the two radially spaced serrations 26. The spherical elements 24 are radially offset from the serrations 26 and in direct contact with the deflection tabs 28, and preferably centrally located with respect to a width of the tabs 28. Thus, once the required force is applied to the steering column assembly 10 to start the telescopic movement of the outer sleeve 12 and bearing sleeve 22 relative to inner tube 18, the deflection tabs 28 deflect in response to contact with spherical elements 24 until reaching the tab attachment ends 281, beyond which the spherical elements 24 bear against the solid unserrated portion of inner tube 18, where the collapse force of the system is highest and relatively constant. The deflection tabs 28 are deflectable in response to the motion of the spherical elements 24 in contact with the deflection tabs 28. The number, width and length of the deflection tabs 28 determines the force profile required to initiate and continue collapse of the steering column assembly through the described mechanical stages. The collapse force profile can be finely tuned by altering the length and number of serrations, or the width of the serrations to alter the size of the deflection tabs, thus changing the required collapse force.

An alternative or supplementary approach to tuning the energy absorption force profile of the assembly is by use of additional spherical elements 24 in the bearing sleeve 22 so that two or more elements 24 which are both radially and axially offset, as shown in FIG. 1, contact the same deflection tab 28, thus increasing the required force of the entire system. Similar offset positioning of additional spherical elements 24 at the end of the bearing sleeve opposite the deflection tabs also affects the force profile somewhat, but is primarily advantageous as a symmetrical configuration to the bearing sleeve 22 which avoids incorrect assembly of the collapsible column components. Also, the bearing sleeve 22 can be constructed with multiple receptacles for elements 24 which are radially and axially offset, with elements 24 being selectively installed in certain receptacles to achieve a particular displacement force profile in a tuned system. Fine tuning of the force profile of the system is thus accomplished by adjustments to the number and placement of the spherical elements in the bearing sleeve, in addition to or in combination with adjustments to the serrations 26 and corresponding deflection tabs 28.

A tuned non-linear energy absorption force profile of a column assembly constructed in accordance with the invention is depicted by the plots of FIG. 6. The "a" plots have a collapse initiation force of below 600 LBF., and a peak force of approximately 820 LBF. prior to leveling off at a steady collapse force of less than 800 LBF. Significantly, the smooth transition or moderate slope leading up to the peak force, and the smooth transition from the peak force to the constant force is achieved by the force tuning of the spherical elements in contact with the deflection tabs as described. This represents a tuned non-linear energy absorption system which performs gradual energy absorption, and which does not exhibit an undesirable high slope or spiked peak load to initiate collapse of the column, and which gradually levels off to the continuous collapse mode after response to the peak load.

Figure 5:
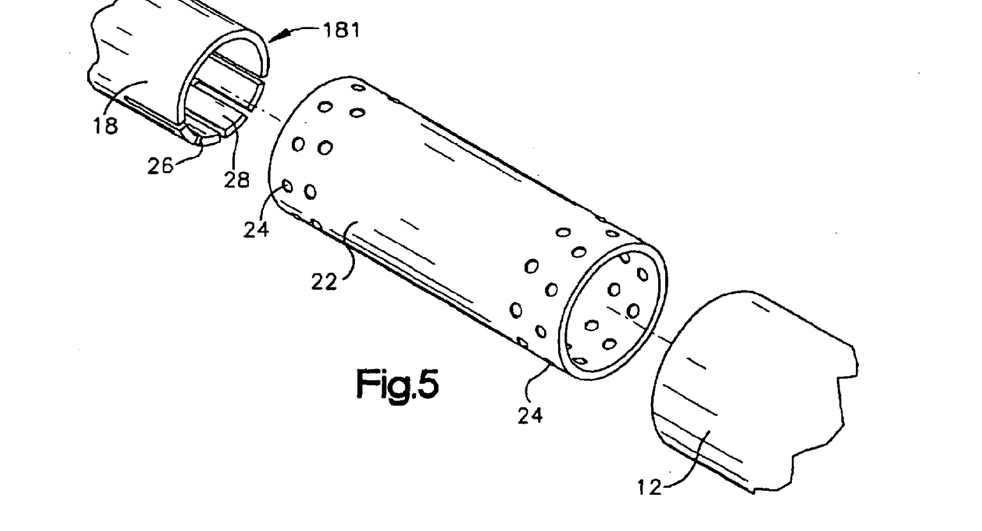
FIG. 5 is an exploded perspective view of a segment of the steering column assembly of the present invention.

Plots "b" illustrate the collapse force profile of a differently tuned system of the invention, with an initial collapse force of approximately 600 LBF., and approximately the same slope as plot "a" up to a peak load of approximately 900 LBF., and thereafter leveling at just under 900 ft.-lbs., again showing very little drop-off from the peak load to the constant collapse load, and a non-linear transition from peak load to continuous collapse. It has been found that the use of additional spherical elements 24 in the radial and axially offset positions, as described and shown in FIGS. 2 and 5, on one or more of the deflection tabs, (and optionally at the opposite end of the bearing sleeve) is effective in essentially eliminating a peak force spike, as shown by plots "b". This fine tuning of the system may also include the described modifications of the length of the serrations with the resulting change in the rigidity and flexure characteristics of the deflection tabs and corresponding change in response of the column assembly.

In an alternate embodiment of the invention, the outer cylindrical sleeve 12 serves as the static component of the assembly, with the bearing sleeve 22 and distal end 14 of the inner tube 18 telescoping into the outer sleeve 12 upon compression or collapse of the system under a load. In such an embodiment, the outer sleeve is thus fixed to a support structure such as a bracket or frame member.

Figure 7:
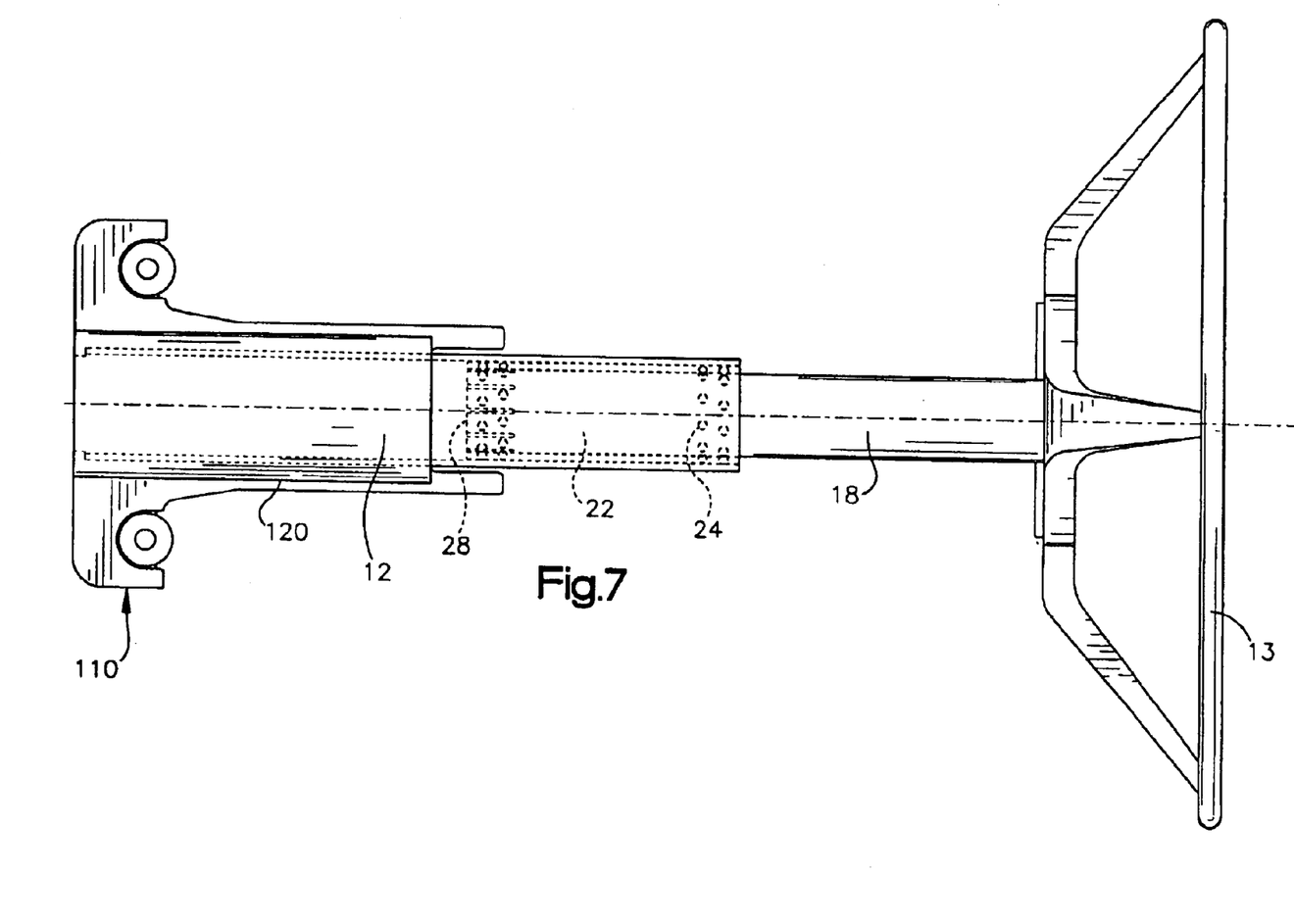
FIG. 7 is a profile view of an alternate embodiment of an energy absorbing column assembly of the invention.

In a variation on the just-described alternate embodiment wherein the outer sleeve 12 is statically mounted and telescopically receives the bearing sleeve 22 and inner tube 18, the outer sleeve 12 may be received within a casting or mounting structure 110. Alternatively, cylindrical bore 120 in any structure, such as casting or machined part which serves as a mounting bracket for the column assembly may be provided in place of the outer sleeve 12, wherein the interior surfaces of the bore 120 serve in place of the interior of outer sleeve 12. FIG. 7 illustrates an alternate embodiment of an energy absorbing column assembly wherein the outer sleeve 12 is received within a cylindrical bore 120 formed in a casting or other mounting structure 110. The bearing sleeve 22 and the inner cylindrical sleeve 18 are telescopically received within outer sleeve 12 in the bore 120. The rolling elements 24 bear against the inner diameter or interior surfaces of the outer sleeve 12. Alternatively, the outer sleeve 12 can be disposed of entirely, and the bearing sleeve 22 and inner tube 18 are received directly within the bore 120. The spherical elements 24 still contact the deflection tabs 28 positioned on the inner cylindrical sleeve 18 and cause them to deflect in response to contact from the spherical elements 24. However, the external force required to collapse the steering column assembly is still directly proportional to the size and number of the deflection tabs 28 positioned on the inner cylindrical sleeve 18.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art of designing and manufacturing steering column assemblies upon reading and comprehending this disclosure. Such features, aspects, and expected variations and modifications of the reported results and examples are clearly within the scope of the invention where the invention is limited solely by the scope of the following claims.

What is claimed is:

1. An energy absorbing column assembly comprising:
    an outer cylindrical sleeve with a first end and a terminal end; an inner tube having an insert end telescopically received within the outer cylindrical sleeve;
    a cylindrical bearing sleeve telescopically received within the outer cylindrical sleeve and fitting over the insert end of the inner tube, the bearing sleeve housing one or more spherical elements in contact with the outer cylindrical sleeve and the inner tube; and
    at least two radially spaced serrations in the insert end of the inner cylindrical sleeve, and a deflection tab between the serrations, the serrations being radially offset from each of the spherical elements in the bearing sleeve.

2. A column assembly of claim 1 wherein a deflection tab is deflectable in response to movement of at least one of the spherical elements in contact with a the deflection tab.

3. The column assembly of claim 1 further including a bracket which attaches to a the terminal end of the outer cylindrical sleeve.

4. The column assembly of claim 1 wherein the radially spaced serrations are positioned around the entire circumference of the insert end of the inner tube.

5. The column assembly of claim 1 wherein the radially spaced serrations are positioned around a portion of the circumference of the insert end of the inner tube.

6. The column assembly of claim 1 wherein the serrations extend at different lengths from each other, creating different sized deflection tabs.

7. The column assembly of claim 1 wherein the bearing sleeve includes a pair of radially and axially offset spherical elements positioned to contact the deflection tab of the inner tube.

8. An energy absorbing steering column assembly comprising:
    a mounting structure with a cylindrical bore; an inner tube having an insert end telescopically received within the bore of the mounting structure;
    a cylindrical bearing sleeve telescopically received within the cylindrical bore and over the insert end of the inner tube, the bearing sleeve housing one or more spherical elements in contact with an internal surface of the bore and the inner tube; and is at least two radially spaced serrations in the insert end of the inner tube, and at least one deflection tab between the serrations, wherein the spherical elements are positioned adjacent to the serrations and in contact with the deflection tab.

9. The steering column assembly of claim 8 wherein the deflection tab is deflectable in response to motion of a spherical element in contact with the deflection tab.

10. The steering column assembly of claim 8 wherein the cylindrical bearing sleeve includes at least one pair of radially and axially spaced spherical elements in contact with the deflection tab.

11. The steering column assembly of claim 8 wherein the bearing sleeve fits entirely within the cylindrical bore.

12. The steering column assembly of claim 11 wherein the bearing sleeve has symmetrical pairs of radially and axially offset spherical elements at each end of the bearing sleeve.

13. The steering column assembly of claim 9 wherein the radially spaced serrations are positioned around a circumference of the insert end of the inner cylindrical sleeve.

14. The steering column assembly of claim 9 wherein the radially spaced serrations are positioned around a portion of a circumference of the insert end of the inner cylindrical sleeve.

15. The steering column assembly of claim 9 wherein the serrations are of different lengths.

16. An energy absorbing column assembly comprising:

an inner tube with an attachment end and an insert end; a bearing sleeve positioned over the insert end of the inner tube; an outer sleeve positioned over the bearing sleeve;

at least two serrations in the insert end of the inner tube;

the bearing sleeve holding at least one spherical element between the serrations and in contact with the outer sleeve and the inner tube.

17. The energy absorbing column assembly of claim 16 wherein the inner tube is fixedly mounted to a support structure.

18. The energy absorbing column assembly of claim 16 wherein the bearing sleeve fits entirely over the inner tube, the bearing sleeve holding a first group of spherical elements proximate to the serrations, and a second group of spherical elements spaced from the serrations.

19. The column assembly of claim 16 wherein the outer sleeve substantially covers the bearing sleeve.

20. The column assembly of claim 16 wherein an end of the outer sleeve is s generally aligned with an end of the bearing sleeve.

21. The column assembly of claim 16 further comprising a deflection tab between the serrations, and wherein the spherical elements are in contact with the deflection tab.

* * * * *

UNITED STATES PATENT AND TRADEMARK OFFICE
CERTIFICATE OF CORRECTION

PATENT NO. : 6,729,648 B2  Page 1 of 1
APPLICATION NO. : 10/165333
DATED : May 4, 2004
INVENTOR(S) : Peter J. Ulintz It is certified that error appears in the above-identified patent and that said Letters Patent is hereby corrected as shown below:

Title Page; should read;
(73) Assignee: Anchor Tool & Die Company, Cleveland, Ohio Signed and Sealed this Sixth Day of March, 2007

JON W. DUDAS
*Director of the United States Patent and Trademark Office*